June 19, 1951 S. W. ARTIS 2,557,213
DAMPER

Filed Sept. 7, 1948 2 Sheets-Sheet 1

Inventor
Samuel W. Artis

By Clarence A. O'Brien
and Harvey B. Jacobson
Attorneys

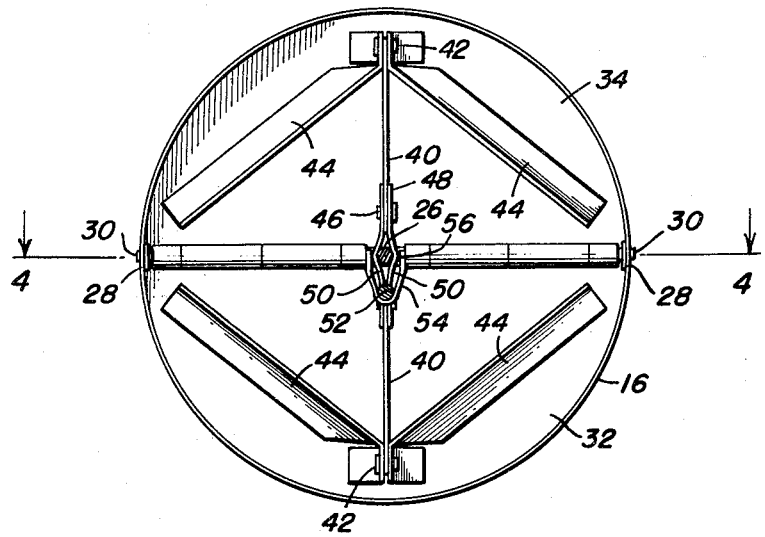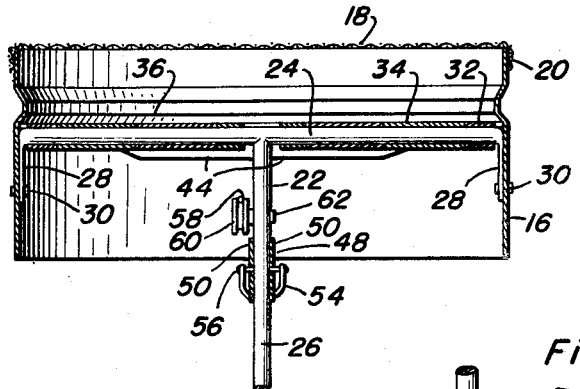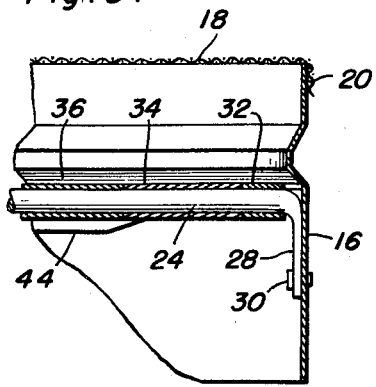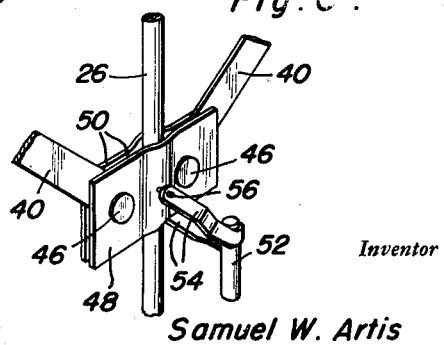

Patented June 19, 1951

2,557,213

UNITED STATES PATENT OFFICE 2,557,213

DAMPER

Samuel W. Artis, Boise, Idaho

Application September 7, 1948, Serial No. 48,096

2 Claims. (Cl. 98—59)

This invention relates to new and useful improvements and structural refinements in dampers, and the principal object of the invention is to provide a damper such as may be conveniently and effectively employed for regulating the passage of air and other gases through ventilating ducts and similar passages.

An important feature of the invention resides in the provision of means for conveniently regulating or setting the position of the damper by remote control.

An additional feature of the invention lies in the provision of means for preventing the passage of birds and other foreign objects through the duct in which the damper is installed.

Important advantages of the invention reside in its simplicity of construction, convenient operation and adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention installed in a ventilating "chimney" or the like;

Figure 3 is an under side plan view of the invention per se, taken substantially on the plane of the line 3—3 in Figure 2 but showing the damper in its closed position while Figure 2 illustrates the damper partially open;

Figure 4 is a cross sectional view, taken substantially on the plane of the line 4—4 in Figure 3;

Figure 5 is a fragmentary cross sectional view illustrating a right hand portion of the subject shown in Figure 4, and Figure 6 is a fragmentary perspective view of the actuating means used in the invention.

Like characters of reference are employed to designate like parts in the specification and throughout the several views.

Figure 1:
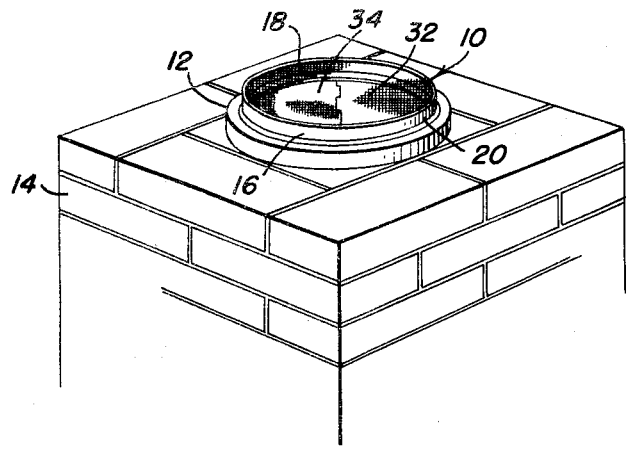

Referring now to the accompanying drawings in detail, the invention consists of a damper designated generally by the reference character 10, the same being intended for controlling the flow of air or other gases through a duct or passage 12 in a ventilating chimney or similar structure 14.

Figure 2:
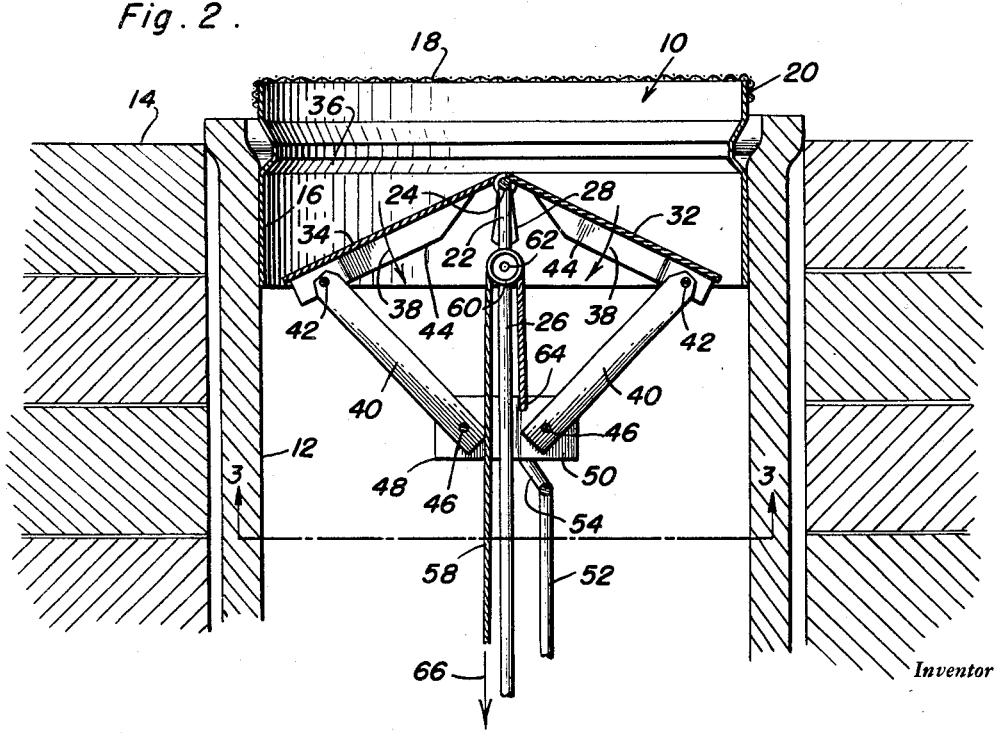
Figure 2 is a vertical cross sectional view of the subject shown in Figure 1.

The damper 10 embodies in its construction what may be referred to as a hollow housing 16, preferably assuming the form of an annulus, this being pressed into or otherwise secured in the duct or passage 12, as shown in Figure 2. It is to be noted that an end portion of the housing 16 projects outwardly from the passage 12 and is provided with a foraminous protector or screen 18, the latter having down turned marginal edges 20 which are secured by welding, or the like, to the housing 16, substantially as shown. The purpose of the projector screen 18 is, of course, to prevent birds and other foreign objects from gaining entry into the duct or passage 12 through the damper 10, as will be clearly understood.

The actual damper structure involves the provision of a substantially T-shaped support member 22, the same including a transverse portion 24 and a central portion 26 disposed at right angles to the portion 24. It is to be noted that the end portions of the central portion 24 are angulated and fastened as at 28 and are secured to the lateral wall of the housing 16 by suitable rivets, or the like, 30, whereby the entire support member 22 is firmly and securely retained in position in the damper housing. A pair of substantially semi-circular, coacting closure plates 32, 34 are provided at the contiguous edges thereof with arcuate sleeves constituting what may be referred to as interfitting hinges, whereby the two closure plates 32, 34 are suitably mounted on the transverse portion 24 of the support member 22, substantially as shown. It may be explained at this point that the housing 16 is provided with what may be called an inwardly extending, marginal or peripheral bead 36 which provides a stop, so to speak, for the closure plates 32, 34 when the latter are in their closed position. However, the closure plates 32, 34 may be swung to a partially open or a fully open position, as exemplified by the arrows 38 in Figure 2, whereby the rate and volume of air flow through the duct or passage 12 may be regulated, as desired.

Means are provided for simultaneously moving or swinging the closure plates 32, 34, these means involving the provision of a pair of links 40 which are pivoted at one end as at 42 to L-shaped reinforcements 44 secured by welding, or the like, to the closure plates 32, 34, the arrangement of these reinforcements being best shown in Figure 3, wherein it will be apparent that the reinforcements are so disposed as to substantially strengthen the plates 32, 34 and thereby prevent the same from buckling or similar distortion.

The remaining ends of the links 40 are pivoted as at 46 to a slide 48, this assuming the form of a pair of juxtaposed strips 50 which are secured together by the pivotal connections 46 and straddle the center portion 26 of the aforementioned support member 22. It should, of course, be understood that the strips 50 are slidable on the portion 26 of the member 22, so that by simply sliding the slide 48 in one direction or the other, the closure plates 32, 34 may be opened or closed, as the case may be.

Downward sliding of the slide 48, and consequently, opening of the damper plates 32, 34 is effected by remote control, this being accomplished by means of a rod 52 which is longitudinally shiftable in the duct 12 and is provided at one end thereof with a fork 54 attached to the slide 48 as at 56. In addition to the push rod 52, a flexible element such as a cable 58 is employed for closing the damper, the element 58 passing around a pulley 60 mounted on the center portion 26 of the support member 22 by means of a suitable pin 62, as illustrated in Figures 2 and 4. One end of the cable 58 is attached as at 64 to the slide 48, (see Figure 2) so that by pulling the cable 58 in the direction of the arrow 66 in Figure 2, the damper plates 32, 34 may be closed. Opening of the damper plates may, of course, be effected either by the force of gravity, or alternatively, by simply pulling the rod 52 in the direction of the arrow 66, as will be clearly apparent.

In conclusion, it may be stated that the instant damper is particularly adapted for use in air conditioning systems, whereby the delivery of conditioned air from a common unit to several rooms or spaces may be effectively controlled by employing a plurality of ducts each equipped with a damper constructed in accordance with the teachings of the instant invention, this arrangement permitting the dampers to be individually adjusted or set, so as to deliver a proper, proportionate supply to each room or space which is to be conditioned.

It is believed that the advantages in use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a damper of the class described, the combination of a hollow substantially cylindrical housing adapted to be mounted in a duct and affording a passage for gas, a T-shaped support member including a transverse portion secured at the ends thereof to diametrically opposite sides of said housing and a vertical portion extending downwardly from said transverse portion, said housing being provided above the transverse portion of said support with an inwardly projecting annular bead, a pair of coacting closure plates having contiguous edges pivotally mounted on said transverse portion for swinging movement from a downwardly extending open position to a substantially horizontal closed position wherein the marginal edge portions thereof abut the lower edge of said bead, a slide slidable on the vertical portion of said support and comprising a pair of spaced complemental strips embracing said vertical portion and a pair of fastening elements connecting said strips together, a set of reinforcing angles secured to the underside of said closure plates, a pair of links pivoted at one end thereof to the respective fastening elements of said slide, the remaining ends of said links being pivoted to the reinforcing angles of the respective closure plates, and means for sliding said slide downwardly and upwardly on the vertical portion of said support, whereby said plates may be respectively opened and closed.

2. The device as defined in claim 1 wherein said means comprise a rigid actuating rod pivoted to said slide and extending downwardly therefrom in the stated duct whereby the slide may be slid downwardly to open said plates, a pulley rotatably mounted on the vertical portion of said support above said slide, and a flexible actuating element extending through the stated duct and having its upper end portion passing around said pulley, the upper end of said element being connected to the slide whereby the latter may be slid upwardly to close said plates.

SAMUEL W. ARTIS.

REFERENCES CITED

The following references are of record in the file of this patent:

UNITED STATES PATENTS

| Number | Name | Date |
|---|---|---|
| 87,668 | Hayes | Mar. 9, 1869 |
| 415,916 | Lhote | Nov. 26, 1889 |
| 683,225 | Rosen | Sept. 24, 1901 |
| 1,100,634 | Turner | June 16, 1914 |
| 1,219,893 | Woolf | Mar. 20, 1917 |
| 1,659,362 | Jardine | Feb. 14, 1928 |
| 1,785,540 | Black | Dec. 16, 1930 |